United States Patent
Niu et al.

(10) Patent No.: US 11,619,852 B2
(45) Date of Patent: Apr. 4, 2023

(54) VOLTAGE CONTROL APPARATUS FOR ELECTRO-OPTIC ELEMENT

(71) Applicant: GENTEX CORPORATION, Zeeland, MI (US)

(72) Inventors: Xiaoxu Niu, Grand Rapids, MI (US); Robert R. Turnbull, Holland, MI (US); Mario F. Saenger Nayver, Zeeland, MI (US); Andrew D. Weller, Holland, MI (US); Kurtis L. Geerlings, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 75 days.

(21) Appl. No.: 17/212,444

(22) Filed: Mar. 25, 2021

(65) Prior Publication Data

US 2021/0302798 A1 Sep. 30, 2021

Related U.S. Application Data

(60) Provisional application No. 62/994,929, filed on Mar. 26, 2020.

(51) Int. Cl.
 *G02F 1/153* (2006.01)
 *G02F 1/15* (2019.01)
 (Continued)

(52) U.S. Cl.
 CPC ............... *G02F 1/15* (2013.01); *B60J 3/04* (2013.01); *E06B 9/264* (2013.01); *E06B 2009/2464* (2013.01)

(58) Field of Classification Search
 CPC ............... G02F 1/13; G02F 1/15; G02F 1/165
 See application file for complete search history.

(56) References Cited

U.S. PATENT DOCUMENTS

| | | | |
|---|---|---|---|
| 9,130,065 B2 * | 9/2015 | Im | ............ H01L 24/13 |
| 9,978,780 B2 | 5/2018 | Lee | |
| 10,268,097 B2 | 4/2019 | Greer | |

FOREIGN PATENT DOCUMENTS

| | | | | |
|---|---|---|---|---|
| WO | 2020046914 A1 | 3/2020 | | |
| WO | WO2020046914 | * | 5/2020 | ............ G02F 1/15 |

OTHER PUBLICATIONS

International Search Report dated Jun. 24, 2021, for corresponding PCT application No. PCT/US2021/024117, 2 pages.

(Continued)

*Primary Examiner* — Joseph P Martinez
(74) *Attorney, Agent, or Firm* — Price Heneveld LLP; Brian James Brewer

(57) ABSTRACT

An electro-optic element is disclosed. The electro-optic element may comprise a voltage control device electrically connected to an electrode of the electro-optic medium. In some embodiments, the voltage control device may be a transistor. The voltage control device may be operable to receive a supply voltage and to output an activation voltage to an electro-optic medium of the electro-optic element. Additionally, the electro-optic element may further comprise a control circuit. The control circuit may be configured to receive at least one feedback signal. Based, at least in part, on the feedback signals, the control circuit may accordingly control the activation voltage output by the voltage control devices.

19 Claims, 7 Drawing Sheets

(51) Int. Cl.
*B60J 3/04* (2006.01)
*E06B 9/264* (2006.01)
*E06B 9/24* (2006.01)

(56) References Cited

OTHER PUBLICATIONS

Written Opinion dated Jun. 24, 2021, for corresponding PCT application No. PCT/US2021/024117, 4 pages.

* cited by examiner

VOLTAGE CONTROL APPARATUS FOR ELECTRO-OPTIC ELEMENT

CROSS-REFERENCE TO RELATED APPLICATIONS

This application claims priority under 35 U.S.C. § 119(e) to U.S. Provisional Application No. 62/994,929 filed on Mar. 26, 2020, entitled "Voltage Control Apparatus for Electro-Optic Element," the disclosure of which is hereby incorporated by reference in its entirety.

FIELD OF THE DISCLOSURE

The present disclosure relates generally to a control system for an electro-optic device and, more particularly, relates to a multi-zone control system for an electro-optic device.

SUMMARY OF THE DISCLOSURE

According to one aspect of the present disclosure, an electro-optic element is disclosed. The electro-optic element may comprise a first substrate, a second substrate, a first electrode, a second electrode, an electro-optic medium, a voltage control device, and a control circuit. The first substrate may have a first interior surface. The second substrate may be disposed in a substantially parallel and spaced-apart relationship relative the first substrate. Further, the second substrate may comprise a second interior surface facing the first interior surface. The first electrode may be associated with the first interior surface. Similarly, the second electrode associated with the second interior surface. The electro-optic medium may be disposed between the first and second electrodes. The voltage control device may be electrically connected to the first electrode. Additionally, the voltage control device may be operable to receive a supply voltage and to output an activation voltage to the electro-optic medium. In some embodiments, the supply voltage may be substantially in excess of the tolerability of the electro-optic medium and the voltage control device is operable to substantially prevent damage of the electro-optic medium. In some embodiments, the voltage control device may be or comprise a transistor. In some such embodiments, the transistor may be a flip chip transistor. In other such embodiments, the transistor may be a thin film transistor. Additionally or alternatively, the voltage control device is aligned substantially interior an area defined by the first interior surface. The control circuit may be configured to receive at least one feedback signal and to control the activation voltage based, at least in part, on the at least one feedback signal.

In some embodiments, the voltage control device may be disposed outside of the first and second substrates and conductively connected to the first electrode through the first substrate. In other embodiments, the voltage control device is substantially disposed between the first and second substrates.

In some embodiments, the electro-optic element may further comprise an electrically conductive trace and an insulating layer. The electrically conductive trace may be associated with the first interior surface. The insulating layer may be disposed between the trace and the first electrode. Further, the insulating layer may have a pass through connection aligned substantially interior an area defined by the first electrode and through which electrical communication may be made between the voltage control device and the first electrode or the voltage control device and the trace.

In some embodiments, the electro-optic element may further comprise a plurality of the voltage control devices. Each voltage control device may be disposed in a zone of the electro-optic element and operable to apply substantially equal voltages to the electro-optic medium within the zone.

In some embodiments, the control circuit may comprise an amplifier operable to provide a gate signal to the voltage control device via a first conductive connection with the voltage control device. The gate signal may be based, at least in part, on a first feedback signal received at a first high impedance input of the amplifier from the voltage control device via a second conductive connection. Further, the voltage control device may be operable to change the output activation voltage based, at least in part, on the gate signal. In some such embodiments, the amplifier may be operable to receive a first voltage input from a controller at a second high impedance input and adjustment of the first voltage input is operable to adjust the gate signal. In some embodiments, the first feedback signal may correspond to the output activation voltage. In some such embodiments, the electro-optic element may further comprise a plurality of voltage control devices and a plurality of respective control circuits.

In some such embodiments, the at least one feedback signal may include a second feedback signal. The second feedback signal may be received at a second high impedance input of the amplifier from the second electrode via a third conductive connection. Further, the second feedback signal may indicate a received activation voltage by a localized portion of the second electrode. The localized portion may be a portion of the second electrode substantially opposite the voltage control device across the electro-optic medium. In some such embodiments, the electro-optic element may further comprise a plurality of respective control circuits. Further, a voltage difference may be determined by comparing the first and second feedback signals. Furthermore, the control circuit may be configured to maintain a substantially constant voltage difference across the electro-optic medium.

In some such embodiments, the first high impedance input may be an inverting input. Conversely, the second high impedance input, may be a non-inverting input. Further, the amplifier may be operable to receive a first voltage input from a controller at the first high impedance input via a fourth conductive connection. The fourth conductive connection may comprise a first resistor having a first resistance. Similarly, the amplifier may also be operable to receive a second voltage input from the controller at the second high impedance input via fifth conductive connection. The fifth conductive connection may comprise a second resistor having a second resistance. Further, the first and second resistances may be substantially equal. Additionally, the second conductive connection may comprise a third resistor having a third resistance, and the third conductive connection may comprise a fourth resistor having a fourth resistance. The fourth resistance may be substantially equal the third resistance. Accordingly, the gate signal may be substantially determined based, at least in part, on the following equation:

$$V_G = R_3/R_1(V_+ - V_-)$$

where $R_1$ is the first resistance, $R_3$ is the third resistance, $V_+$ is the second voltage, and $V_-$ is the first voltage.

In some such embodiments, the control circuit may further comprise a first amplifier buffer and a second amplifier buffer. The first amplifier buffer may be disposed between the amplifier and the third resistor. Similarly, the second amplifier buffer may be disposed between the amplifier and the fourth resistor.

In some embodiments, the electro-optic element may further comprise a plurality of the voltage control devices. Additionally, each of the voltage control devices may be disposed in a zone of the electro-optic element. Further, an activation of each zone may be adjusted in parallel by controlling the voltage output of each voltage control device. In some such embodiments, the zones are spaced apart substantially evenly.

These and other features, advantages, and objects of the present disclosure will be further understood and appreciated by those skilled in the art by reference to the following specification, claims, and appended drawings.

DETAILED DESCRIPTION

Figure 1:
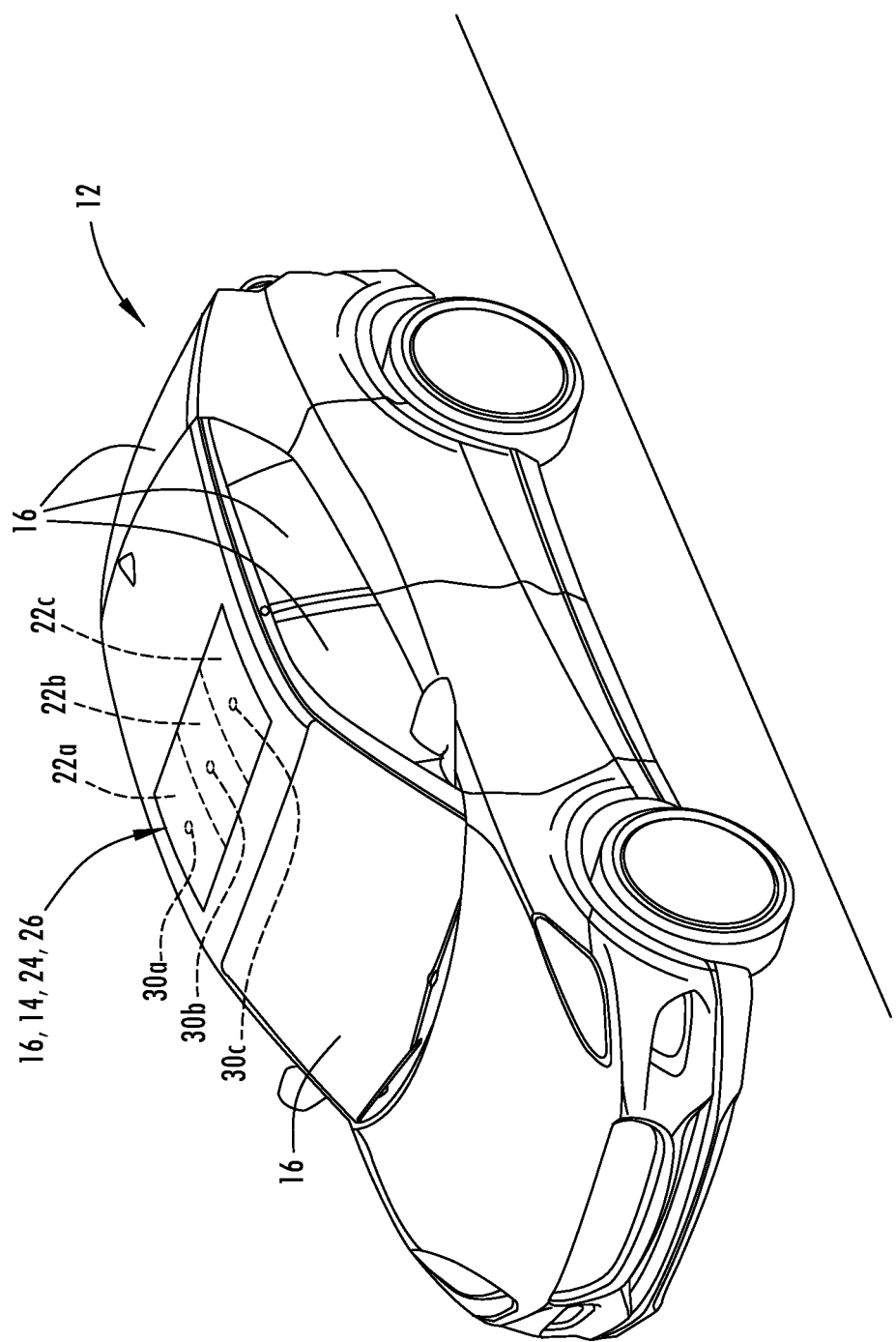
FIG. 1 is a projected view of a vehicle demonstrating a variable transmittance window control system.

The presently illustrated embodiments reside primarily in combinations of method steps and apparatus components related to an electrical control circuit and configuration for controlling an activation of an electro-optic device or element. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

The specific devices and processes illustrated in the attached drawings and described in this specification are simply exemplary embodiments of the inventive concepts defined in the appended claims. Hence, specific characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1-8, an electro-optic element 14 and a corresponding control system 10 are shown. The electro-optic element 14 may be incorporated into one or more portions of a vehicle 12, such as a window panel 16. The window panel 16, for example, may be a side window, a rear window, a sunroof 26, and/or a windshield. Further, the electro-optic element 14 can be held by a partial or full-frame that may be used to support and/or move the window panel 16, as desired.

The electro-optic element 14 as discussed herein may be configured to vary a transmission of light therethrough. Accordingly, the electro-optic element 14 may correspond to an electrochromic device being configured to vary the transmissivity of the assemblies discussed herein in response to an applied voltage from one or more of the control modules 50. Examples of control circuits and related devices that may be configured to provide for electrodes and hardware configured to control the electro-optic element 14 are generally described in commonly assigned U.S. Pat. No. 8,547,624 entitled "VARIABLE TRANSMISSION WINDOW SYSTEM," U.S. Pat. No. 6,407,847 entitled "ELECTROCHROMIC MEDIUM HAVING A COLOR STABILITY," U.S. Pat. No. 6,239,898 entitled "ELECTROCHROMIC STRUCTURES," U.S. Pat. No. 6,597,489 entitled "ELECTRODE DESIGN FOR ELECTROCHROMIC DEVICES," and U.S. Pat. No. 5,805,330 entitled "ELECTRO-OPTIC WINDOW INCORPORATING A DISCRETE PHOTOVOLTAIC DEVICE," the entire disclosures of which are incorporated herein by reference. Examples of electrochromic devices that may be used in windows are described in U.S. Pat. No. 6,433,914 entitled "COLOR-STABILIZED ELECTROCHROMIC DEVICES," U.S. Pat. No. 6,137,620 entitled "ELECTROCHROMIC MEDIA WITH CONCENTRATION-ENHANCED STABILITY, PROCESS FOR THE PREPARATION THEREOF AND USE IN ELECTROCHROMIC DEVICES," U.S. Pat. No. 5,940,201 entitled "ELECTROCHROMIC MIRROR WITH TWO THIN GLASS ELEMENTS AND A GELLED ELECTROCHROMIC MEDIUM," and U.S. Pat. No. 7,372,611 entitled "VEHICULAR REARVIEW MIRROR ELEMENTS AND ASSEMBLIES INCORPORATING THESE ELEMENTS," the entire disclosures of which are incorporated herein by reference. Other examples of variable transmission windows and systems for controlling them are disclosed in commonly assigned U.S. Pat. No. 7,085,609, entitled "VARIABLE TRANSMISSION WINDOW CONSTRUCTIONS," and U.S. Pat. No. 6,567,708 entitled "SYSTEM TO INTERCONNECT, LINK, AND CONTROL VARIABLE TRANSMISSION WINDOWS AND VARIABLE TRANSMISSION WINDOW CONSTRUCTIONS," each of which is incorporated herein by reference in its entirety. In other embodiments, the electro-optic device may comprise a suspended particle device, liquid crystal, or other systems that changes transmittance with the application of an electrical property.

Figure 2:
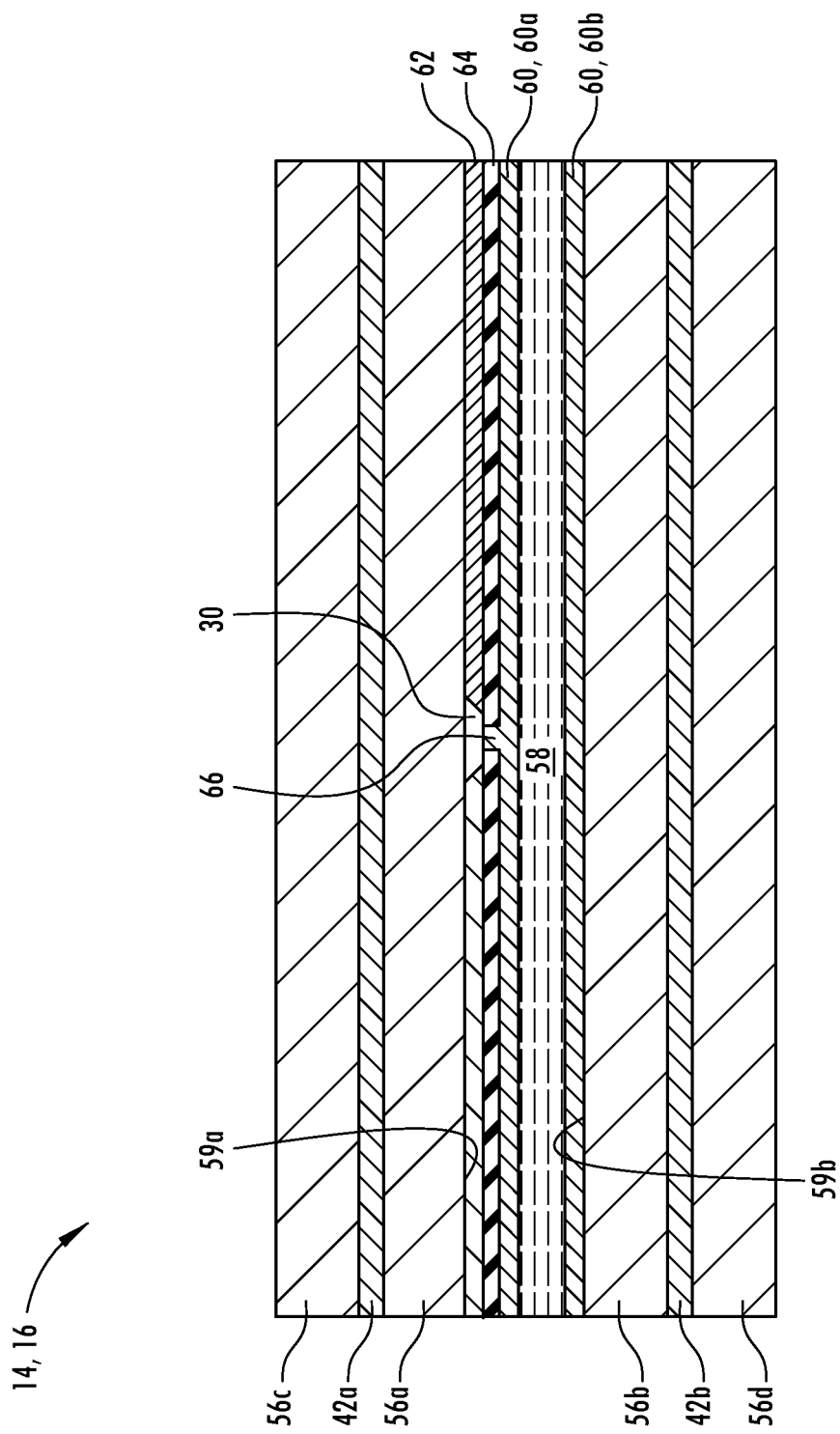
FIG. 2 is a cross-sectional view of an electro-optic device.
Figure 3:
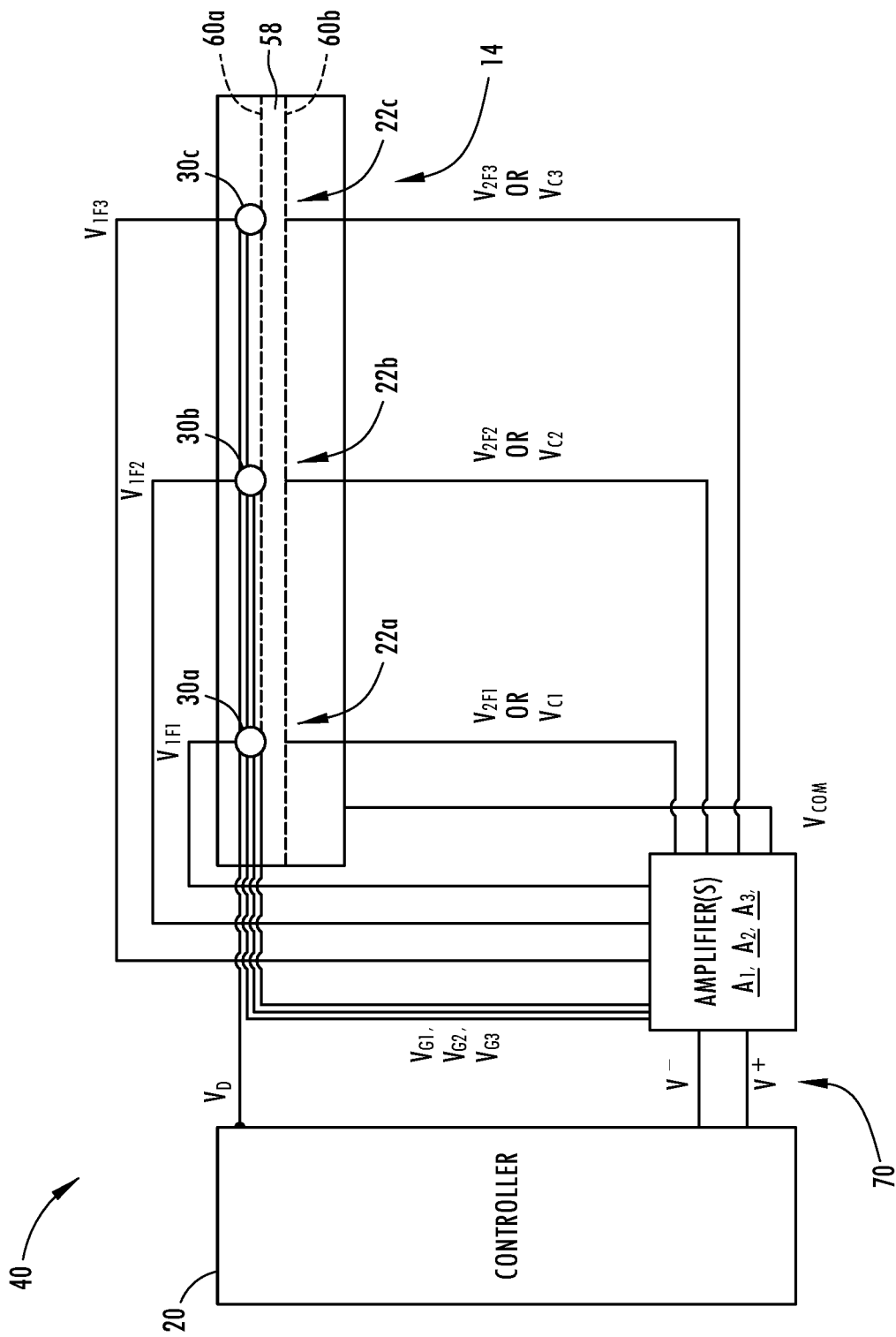
FIG. 3 is a schematic diagram of an electro-optic element comprises a voltage control device and control circuit.

Referring now to FIG. 2, a detailed cross-section of the electro-optic element 14 is shown. As shown, the electro-optic element 14 demonstrated comprises a stacked structure comprising a plurality of substrates 56. The stacked structure may comprise a first substrate 56a oriented to a second substrate 56b in a substantially parallel and spaced-apart relationship. The electro-optic element 14 and substrates 56 may be formed of various materials. For example, the substrates 56 may be of plastic. Plastics for the substrates may include but are not limited to, a clear polycarbonate, polyethylene terephthalate (PET), polyamide, acrylic, cyclic olefin, polyethylene (PEN), metallocene polyethylene (mPE), silicone, urethane, and various polymeric materials. The substrates 56 may also or alternatively be of various forms of glass, including, but not limited to, soda-lime float glass, borosilicate glass, boro-alunminosilicate glass, or various other compositions. When using glass substrates, they can be annealed, heat-strengthened, chemically strengthened, partially tempered, or fully tempered.

Additionally, each of the substrates 56 may comprise an interior surface 59. Accordingly, the first substrate 56a may comprise a first interior surface 59a and the second substrate 56b may comprise a second interior surface 59b. Specifically, the interior surface 59 may be the surface of each respective substrate 56 that faces the gap between the first and second substrates 56a, 56b. In other words, the interior surface 59 may be the surface of one of the substrates 56 facing the other substrate 56. Therefore, the first and second interior surfaces 59a, 59b may face one another.

Further, each interior surface 59 may be associated with an electrode 60. Thus, the first and second interior surfaces 59a, 59b may, respectively, be associated with a first electrode 60a and a second electrode 60b. Accordingly, in some embodiments, the first electrode 60a and/or the second electrode 60b may be disposed on the first interior surface 59a and the second interior surface 59b, respectively. The electrodes 60, may be an electrically conductive material. For example, the electrodes 60, for example, may be formed of substantially transparent conductive oxide (TCO), such as fluorine doped tin oxide (FTO), indium doped tin oxide (ITO), doped zinc oxide, and indium zinc oxide (IZO).

Additionally, an electro-optic medium 58 may be disposed in the gap between the first and second substrates 56a, 56b. Accordingly, the electro-optic medium 58 may be disposed between the first and second electrodes 60a, 60b. These first and second electrodes 60a, 60b are operable to apply an electrical potential (i.e. a voltage) to the electro-optic medium 58. The electro-optic medium 58 may be operable between substantially activated and substantially un-activated states based upon exposure to a particular electrical potential. The degree of activation may be to variable extents proportional to the magnitude of the potential. Accordingly, there may be a plurality of substantially activated states corresponding to various degrees of activation. In some embodiments, the electro-optic medium 58 may be electrochromic. Regardless of its ordinary meaning, the term "electrochromic" may mean a component that exhibits a change in its extinction coefficient at one or more wavelengths in the electromagnetic spectrum upon exposure to a particular electrical potential. Therefore, electro-optic medium 58 and/or electro-optic element 14 may be variably transmissive.

In some embodiments, the first and second substrates 56a, 56b may be enclosed by or laminated with a third substrate 56c and/or a fourth substrate 56d. The third substrate 56c and/or the fourth substrate 56d may be implemented as exterior protective layers configured to protect the electro-optic element 14 from damage. Additionally, the third and fourth substrates 56c, 56d may be configured to connect two or more sections or segments of electro-optic elements 14 to form a composite electro-optic panel. Further, the third and fourth substrates 56c, 56d may be laminated to the first and second substrates 56a, 56b by a first lamination layer 42a and a second lamination layer 42b, respectively. The substrates 56, as well as one or more protective coatings, may be adhered together by one or more cross-linked materials, such as the first and/or second lamination layers 42a, 42b. For example, the cross-linked material may correspond to at least one of the following materials: polyvinyl butyral (PVB), ethylene-vinyl acetate (EVA), thermoset EVA ethylene-vinyl acetate (EVA), and thermoplastic polyurethane (TPU). The specific materials are described in the disclosure and may correspond to exemplary materials that may be employed as heavily cross-linked materials to adhere to one or more of the substrates 56a, 56b and/or additional substrates 56c, 56d. Additionally, the third and fourth substrates 56c, 56d may be applied to the first and second substrates 56a, 56b via a multi-stack coating applied to the exterior surfaces similar the lamination layers 42a, 42b.

The control system 10 may control one or more electro-optic element 14. More specifically, the control system 10 may control the activation of an electro-optic element 14. Accordingly, a controller 20 of the control system 10 may be operable to adjust a transmittance of light through a respective window panel 16 based, at least in part, on a control signal from a controller 20. The control signal may be operable to control the electrical potential applied to the electro-optic medium 58 by the first and second electrodes 60a, 60b.

Additionally, in some embodiments, each electro-optic element 14 may have a plurality of portions or zones. Further, these zones 22 may e arranged in any number of manners. While the electro-optic element 14 may be scaled or adjusted to have any number of zones 22, the electro-optic element 14 is described and illustrated, for exemplary explanatory purposes only, as having a first zone 22a, a second zone 22b, and a third zone 22c. For each zone, a voltage applied to the portion of the electro-optic medium 58 within the zone, by respective portions of the first and second electrodes 60a, 60b within the zone, may be substantially controlled by the control system 10.

Additionally, the control system 10 may have one or more control circuit 40. A control circuit 40 may have one or more voltage control device 30. In an exemplary embodiment, the voltage control device 30 may be implemented as being or as comprising a transistor $Q_n$, where n is a number associated with a respective voltage control device 30. For example, $Q_1$ $Q_2$, and $Q_3$ may correspond to the first, second, and third voltage control devices 30a, 30b, 30c, respectively. The voltage control devices 30, for example, may be metal-oxide field-effect transistors (MOSFETs), thin-film transistors (TFTs), or bipolar junction transistors (BJTs). In some embodiments, the transistor may be a flip chip style transistor. Further, the transistor may have a solvent resistant underfill. Each voltage control device 30 may be associated with and correspond to a particular zone 22. In some embodiments, the voltage control device 30 may be disposed substantially central a zone 22 of the electro-optic element 14. Further, each voltage control device 30 may be electrically connected (directly or indirectly) to a portion of the first and/or second electrodes 60a, 60b within the respective zone 22. Accordingly, the localized activation and/or transmittance of each of the zones 22 may be controlled by the voltage control device 30. The voltage applied to the electrode 60 by the voltage control device 30 may be referred to as an activation voltage. These activation voltages are designated as $V_{An}$, where n is a number associated with a respective voltage control device 30 (e.g. 1, 2, or 3 for 30a, 30b, or 30c, respectively). Accordingly, $V_{A1}$, $V_{A2}$, and $V_{A3}$ may correspond to the first, second, and third voltage control devices 30a, 30b, 30c, respectively. Each activation voltage may traverse the electro-optic medium 58 to a corresponding zone 22 of the second electrode 58b. Accordingly, the output voltage may be operable to substantially activate the electro-optic medium 58 within the respective zone 22.

Additionally, a voltage control device 30 may be aligned substantially interior an area defined by the first and/or second interior surfaces 59a, 59b. Thus, one or more voltage control device 30 may be disposed such that it is not at a periphery of the electro-optic element 14 but is located substantially within a viewing portion of the electro-optic element 14. Additionally, the voltage control devices 30 may be shielded from view and external radiation via a mask or coating applied to one or more surfaces of the substrates 56.

In some embodiments, the zones 22 may be substantially evenly distributed across the electro-optic element 14. Further, the voltage control devices 30 may, likewise, be spaced apart substantially evenly. Therefore, in some embodiments, the control system 10 may be operable to control a voltage provided by each of the voltage control devices 30, such that electrical current may be substantially evenly delivered to each of the zones 22. Such distribution may provide for improved adjustability and/or uniformity of the transmittance of the window panel 16 increasing the uniformity of a voltage applied across the first and second electrodes 60a, 60b of the electro-optic element 14.

In other embodiments, the zones 22 may be proportioned and/or distributed in a variety of arrangements and configurations that may suit a desired application. For example, each of the zones 22 may be separated and proportioned such that some portions of the electro-optic device 14 activate at a faster rate than others. Similarly, the electro-optic elements may be used in various combinations, such that the electro-optic element 14 may include distinct and independently controlled zones, each with separate control circuits 40 and/or control inputs. Accordingly, the disclosure may provide for the system 10 to be scaled or applied in a variety of combinations without departing from the spirit of the disclosure.

In some embodiments, the voltage control devices 30 may be disposed between the substrates 56. However, in other embodiments, the voltage control devices 30 may be located outside the first and second substrates 56a, 56b and conductively connected to one of the electrodes 60 and through a substrate 56 by way of a through-glass via, an opening, or another similar conductive connection.

Additionally, in some embodiments, the electro-optic element 14 may further comprise one or more traces 62 and/or one or more mask and/or insulating layer 64. These elements may be incorporated into the electro-optic element 14 as intermediate layers disposed between the substrate 56 and the electrode 60. Such layers may be applied as coatings, vapor depositions, masks (shadow masks), etched or other visually transparent conductive or insulating layers. More specifically, one or more mask and/or insulating layer 64 may be disposed between one or more trace 62 and the electrode 60. The traces 62 may be electrically conductive. Accordingly, the traces 62 may be formed of the same or similar materials as those suitable for the electrodes 60. The insulation layers 64 may be formed from substantially transparent insulators, such as magnesium fluoride, silicon dioxide, polymeric materials. In this configuration, the traces 62 and the electrode 60 may be substantially conductively isolated from each other by way of the intermediary insulating layer 64. These traces 62 may be used to create electrical connections with the one or more of the voltage control device 30. Accordingly, a thin film circuit may be formed on one or more of the interior surfaces 59 of the substrates 56. Further, the insulating layer 64 may comprise one or more pass through connection 66 to, depending on the disposition of the voltage control device 30, allow electrical connection between the trace 62 and the voltage control device 30 and/or the voltage control device 30 and the electrode 60. The pass-through connection 66 may be a hole or aperture formed in the insulating layer 64. In the electrical schematics of FIGS. 3-7, the illustrated electrical conductive connections may completely or partially be a trace 62.

A benefit of the voltage control devices 30 may be their central disposition within the zones 22. In this configuration, the voltage supplied to each of the zones 22 may be controlled locally or in close proximity (e.g. within 10 mm) to the output from the voltage control devices 30 to the electro-optic medium 58.

Figure 4:
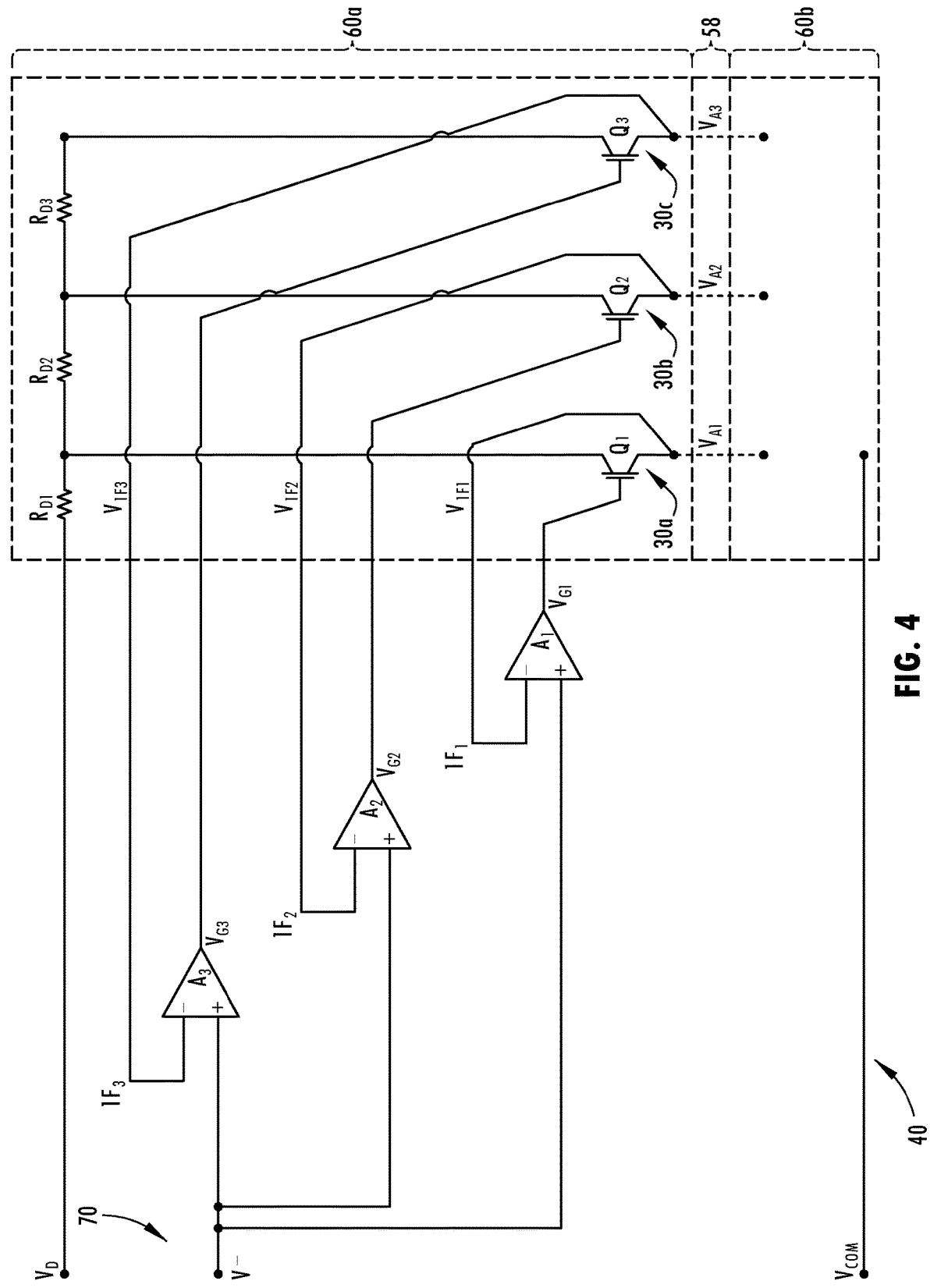
FIG. 4 is a circuit diagram of a driving circuit configured to control the transmittance of an electro-optic element.

Now referring to the circuit schematic depicted in FIG. 4, exemplary embodiments of the control circuit 40 are shown. A supply voltage, referred to as a drain voltage $V_D$, may be supplied to the voltage control devices 30 from the controller 20 and/or a power source. This voltage may be supplied via a conductive connection. In operation, the drain voltage $V_D$ may be delivered by a common node or bus. Further, the drain voltage $V_D$ may be supplied to the voltage control devices 30 by one or more trace 62.

Further, each of the voltage control devices 30 may be in conductive connection with one or more amplifiers $A_n$, where n is the number associated with a respective voltage control device 30 (e.g. 1, 2, or 3 for 30a, 30b, or 30c, respectively), such as op-amps, via a gate (FET) or base terminal (BJT). Accordingly, $A_1$, $A_2$, and $A_3$ may correspond to the first, second, and third voltage control devices 30a, 30b, 30c, respectively. Each amplifier may have two high impedance inputs. Of these two high impedance inputs, one may be an inverting input (−) and the other may be a non-inverting input (+). Additionally, each amplifier may have a low impedance output. The output may be based, at least in part, on the two high impedance inputs.

Additionally, as shown, a first feedback signal may be supplied to an inverting input of each amplifier $A_n$, via a conductive connection 1Fn, where n is the number associated with a respective voltage control device 30. The first feedback signal may be supplied back as a voltage $V_{1Fn}$, where n is the number associated with a respective voltage control device 30. Additionally, the first feedback signal may correspond to a respective activation voltage $V_{An}$. Accordingly, in some embodiments, $V_{1Fn}$ may be substantially equal $V_{An}$. Based, at least in part, on the first feedback signal $V_{An}$, an amplifier $A_n$ may output a gate voltage signal $V_{Gn}$, where n is the number associated with the respective amplifier $A_n$ and/or voltage control device 30. For example, $V_{G1}$ is the gate signal from the first amplifier $A_1$ to the first voltage control device 30a, $V_{G2}$ is the gate signal from the second amplifier $A_2$ to the second voltage control device 30b, and $V_{G3}$ is the gate signal from the third amplifier $A_3$ to the third voltage control device 30c. The output gate voltage $V_{Gn}$ may be received by the respective voltage control device 30 via a conductive connection. In this configuration, the activation voltages $V_{An}$ associated with each of the voltage control devices 30 and corresponding zones 22 may be actively regulated via gate voltage signals $V_{Gn}$ based, at least in part, on the first feedback signals $V_{1Fn}$. Further, the conductive connections between the amplifiers $A_n$ and the respective voltage control devices 30 may be implemented as thin traces over long distances (e.g. via high resistance conductors) without compromising DC regulation due to the each of the connections terminating at high-impedance nodes.

In some embodiments, the conductive connections connecting a voltage control device 30 to a respective amplifier $A_n$ may be, at least in part, one or more trace 62. Further, the conductive connections may be terminated at high impedance nodes of the amplifier $A_n$ and/or the voltage control device 30. Accordingly, the conductive connections may not be required to transmit significant current while still conducting signals. Further, the amplifiers $A_n$ may operate as inverting, differential, or other, more sophisticated forms of amplifiers, and control the activation voltage $V_{An}$ output from each of the voltage control devices 30 to correct for variations in the drain voltage $V_D$ delivered to each of the voltage control devices 30.

Further, each amplifier $V_{An}$ may receive one or more inputs 70. A first input of the one or more the inputs 70 may be a cathodic voltage input. Accordingly, the cathodic voltage input may correspond to a positive electrical connection, represented by $V_+$. Additionally, in some embodiments, such as the one illustrated in FIG. 4, the cathodic voltage input may be supplied to a non-inverting input of each amplifier. These inputs 70 may be supplied by a controller 20. Further, these inputs 70 may be adjusted to control the amplifiers $A_n$.

The amplifiers or other active devices as discussed herein may be mounted outside the electro-optic element 14 (e.g. along a perimeter edge) directly to the substrates 56 with chip-on-glass (COG) techniques or as separate drivers (e.g. printed circuit boards) bonded to the electrodes. Accordingly, the control circuits 40 as discussed herein may be manufactured as stand-alone devices.

The controller 20 may control the operation of the circuit 40 by adjusting at least one amplifier input 70 (e.g. $V_-$), received by each amplifier $A_n$ via a conductive connection. In operation, the amplifier inputs 70 may be configured to actively control the gain of the amplifiers $A_n$. The gain of the amplifiers $A_n$ may adjust gate voltage $V_{Gn}$ signals output from an amplifier to a respective voltage control device 30. In turn, these gate signals $V_{Gn}$ may be supplied to the voltage control devices 30 via the conductive connection. Further, the gate voltage signal $V_{Gn}$ may be operable to adjust the activation voltage $V_{An}$ output from each of the voltage control devices 30, which are each supplied by the supply voltage or drain voltage $V_D$. Accordingly, the controller 20 may be operable to adjust the voltage output from a voltage control device 30 by way of adjusting a gate voltage $V_{Gn}$ signal output from a respective amplifier $V_{An}$ by way of adjusting the cathodic voltage input $V_+$.

In connection with the electrode 60 (e.g. the second electrode 60b) on the opposite side of the electro-optic medium 58 relative the voltage control devices 30, a continuous $V_{COM}$ plane or multiple, segmented $V_{COM}$ planes $V_{Cn}$ may be implemented without any active components necessary. $V_{com}$ may serve as a zero voltage reference to the amplifiers $A_n$. In most cases, $V_{COM}$ may be driven to 0V to provide positive potential across the electro-optic medium 58. In this configuration, reverse biasing of the voltage potential applied across the electro-optic medium 58 is possible by holding $V_{1Fn}$ to 0V while driving $V_{COM}$ to a higher voltage potential. Accordingly, the disclosure provides for the control circuits 40 to be implemented in a variety of ways to accurately control the state of the electro-optic element 14 with optimized performance without damaging the electro-optic medium 58.

The control system 10 may provide a number of advantages addressing complications related to scalability of the electro-optic element 14. The control system 10 may control the voltage applied to each of the zones 22 distributed across the electro-optic element 14. As the surface 24 of the electro-optic element 14 increases in proportions, the drain voltage $V_D$ may have a drop in voltage at each of the voltage control devices 30. Further, the voltage drop at each of these voltage control devices 30 may be different. This drop in voltage may be caused by line or sheet resistance in delivering the drain voltage to each of the zones 22 and corresponding voltage control devices 30. This resistance of may be inherent in the conductive connection. Accordingly, to signify this resistance, resistors $R_{DX}$ are illustrated to signify the resistance of a correspond portion of the conductive connection, where x is an arbitrary number associated with a portion of the conductive connection. For example, resistance may be illustrated as $R_{D1}$, $R_{D2}$, or $R_{D3}$. These considerations may increase over an increasing distance. Therefore, the voltage drop may increase for the control devices 30 as their distance from the voltage supply increases. Accordingly, zones 22 increasingly interior in alignment with an area defined by an interior surface 59 may experience increasing voltage drops. This voltage drop may cause a reduction in activation of the electro-optic element 14 at the affected zones 22. To further complicate this issue of scalability, the operation and response of the electro-optic element 14 may vary significantly as a result of temperature fluctuations of the electro-optic element 14. Further, size may impact the temperature fluctuations across the electro-optic element 14. To combat these issues and ensure that the electro-optic element 14 is accurately and consistently adjusted in activation voltage $V_{An}$ and thus transmittance, the control system 10 provides for a novel solution in the form of a control circuit 40 configured to control the voltage output from each of the voltage control devices 30.

In this configuration, each of the zones 22 may be accurately supplied with a control voltage to accurately control a degree of activation of the electro-optic element 14 within a zone 22 by a localized activation voltage from the voltage control device 30 within the zone 22. Accordingly, the activation of the electro-optic element 14 in each zone 22 may be adjusted in parallel by controlling a constant and/or consistent activation voltage $V_{An}$ applied to each of the zones 22 via the respective voltage control devices 30.

Additionally, the drain voltage $V_D$ may be delivered to each of the control devices 30 at a voltage potential that may otherwise damage the electro-optic element 14 if not regulated by the voltage control devices 30. However, by distributing the voltage control devices 30 over the surface area of the electro-optic element 14, the voltage potential may be delivered to the voltage control devices 30 in excess of the operational requirements and/or tolerability of the electro-optic element 14 and/or electro-optic medium 58 while preventing damage to the electro-optic element 14. For example, in some embodiments, the activation voltage $V_{An}$ supplied across the electro-optic medium 58 may not exceed approximately 3V to 5V. However, in such an embodiment, the drain voltage $V_D$ may substantially exceed 5V due, at least in part, to the implementation of the voltage control devices 30. Similarly, the localized control of the activation voltage may allow the control circuits 40 to correct for significant variations or ripples in the drain voltage $V_D$. Additionally, a voltage drop of the drain voltage $V_D$ on the common bus can be tolerated as long as the lowest potential is higher than a product of the turn-on-resistance (Ron) of the voltage control devices 30 and local current draw plus the potential voltage applied to control the grayscale of the electro-optic medium 58.

Figure 5:
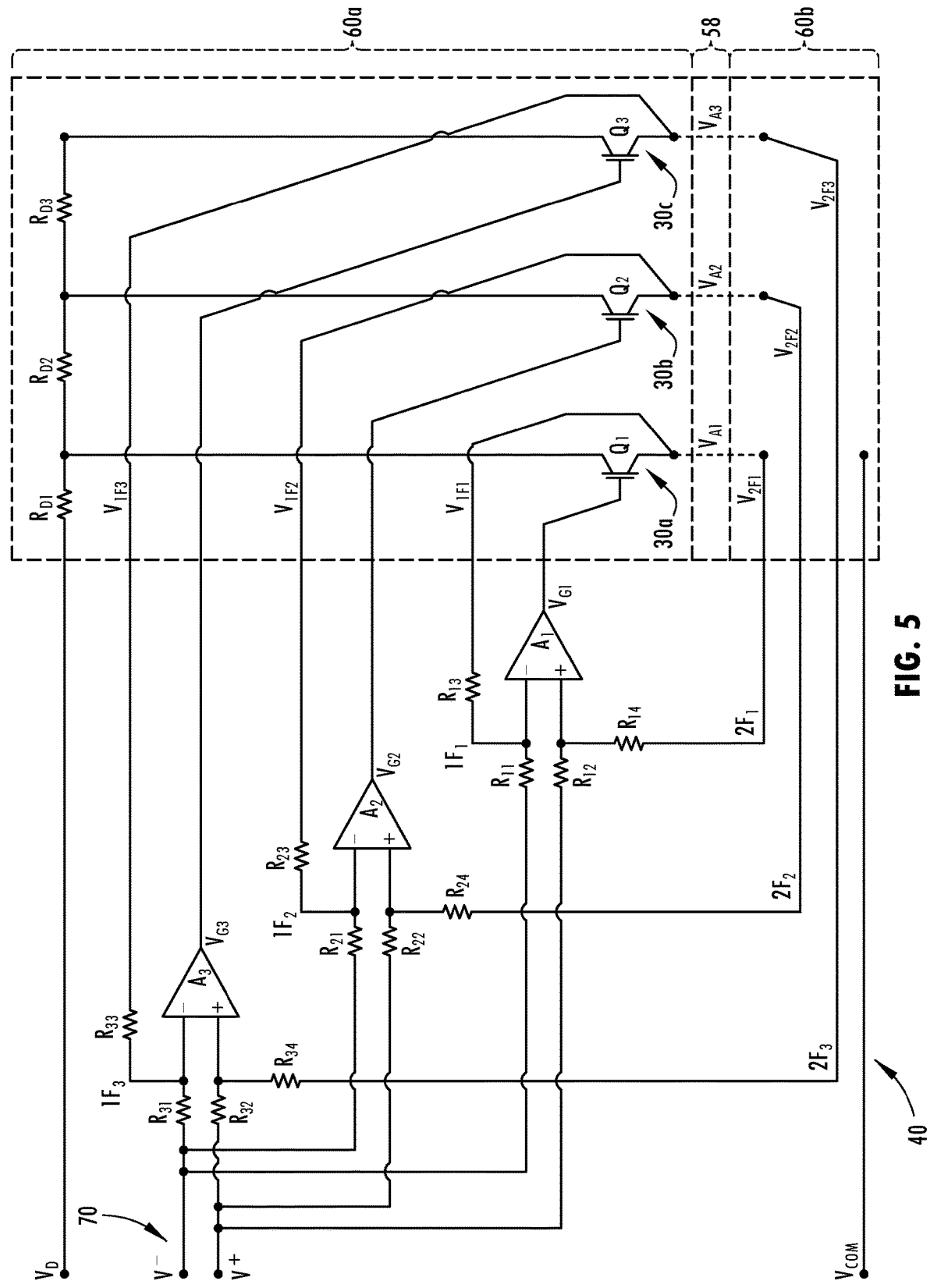
FIG. 5 is a circuit diagram of a driving circuit configured to control the transmittance of an electro-optic element.
Figure 6:
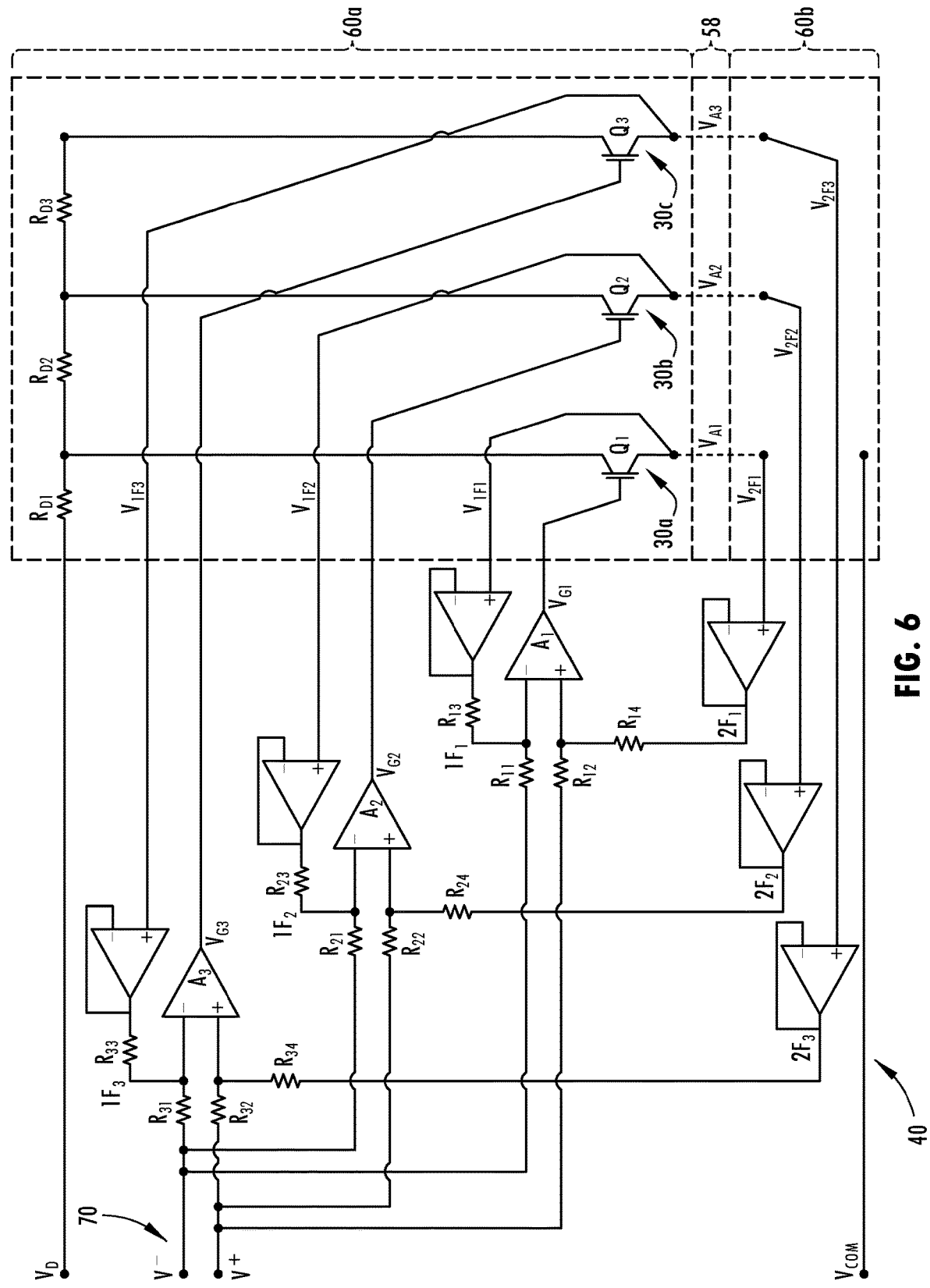
FIG. 6 is a circuit diagram of a driving circuit configured to control the transmittance of an electro-optic element.
Figure 7:
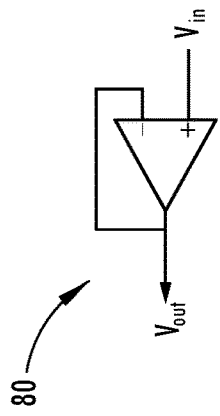
FIG. 7 is a circuit diagram of an amplifier buffer.

Referring now to FIGS. 4-6, examples of the control circuit 40 are shown. In FIG. 4, a first example is shown as the control circuit 40. Similarly, in FIG. 5, a second example is shown as the control circuit 40. Likewise, in FIG. 6, a third example is shown as the control circuit 40. Each of the control circuits 40 may comprise similar elements to the control circuits 40 described. Accordingly, the like elements of these circuits may be implemented in various combinations as will be understood by those skilled in the art. The similar or like features control circuits 40 as described herein are not independent, but rather demonstrated as variations, which may be implemented in combination.

In some embodiments, as illustrated in FIGS. 5-6, the control circuit 40 may provide for feedback not only from the voltage control devices 30, by way of the first feedback signal, but may also provide for feedback via a second feedback signal. The second feedback signal may indicate a localized voltage received at the other electrode, such as the second electrode 60b, opposite a respective voltage control device 30 across the electro-optic medium 58. In other words, the second feedback signal may correspond to the activation voltage $V_{An}$ actually received by the other electrode within the respective zone 22. This may be beneficial because the activation voltage $V_{An}$ received the other electrode may be less than what it was output by the respective voltage control device 30. The second feedback signal may be supplied to the respective amplifier $A_n$ via a conductive connection 2Fn, where n is the number associated with a respective amplifier $A_n$ and/or voltage control device 30. Further, the conductive connection 2Fn may originate substantially opposite the voltage control device 30 such that it is in substantial alignment therewith across the electro-optic medium 58. Further, the second feedback signal may be supplied back as a voltage $V_{1Fn}$, where n is the number associated with a respective amplifier $A_n$ and/or voltage control device 30. Accordingly, each of the amplifiers $A_n$ may be configured to monitor the activation voltages $V_{An}$ output by the voltage control devices and/or the localized activation voltages $V_{An}$ received by the other electrode within a respective zone 22 to control the voltage supplied across the electro-optic medium 58. In this configuration, the control circuit 40b may be configured to accurately maintain a constant drop across the electro-optic medium 58 by monitoring a difference between the first and second voltage signals.

In such an embodiment, the cathodic voltage input may be supplied to the inverting input of each amplifier $A_n$ along with the first feedback signal. Additionally, in such an embodiment, each amplifier $A_n$ may additionally receive a second input of the one or more inputs 70. The second input may be an anodic voltage input. Accordingly, the anodic voltage input may correspond to a negative electrical connection, represented by $V_-$. Further, the anodic voltage input may be supplied to the non-inverting input of each amplifier.

To tune the operation of the amplifiers $A_n$; each of the inputs and/or feedbacks may be passed through a resistor $R_{ny}$, where n where n is the number associated with a respective amplifier $A_n$ and/or voltage control device 30 and y is an number used to differentiate resistors corresponding to a common amplifier $A_n$. More specifically, resistors a part of the conductive connection for the $V_-$ input may have a y value of 1; resistors a part of the conductive connection for $V_+$ may have a y value of 2; resistors a part of the conductive connection $1F_n$ may have a y value of 3; and resistors a part of conductive connection $2F_n$ may have a y value of 4. In at least one example, the resistance of $R_{n1}$ may be substantially equal to $R_{n2}$ and $R_{n3}$ may be substantially equal to $R_{n4}$. Accordingly, the output gate voltage $V_{Gn}$ from each of the respective amplifiers $A_n$ may be controlled based on the voltage difference between $V_-$ supplied to the inverting input and $V_+$ supplied to the non-inverting input, as shown in Equation 1.

$$V_{Gn} = R_{n3}/R_{n1}(V_+ - V_-) \quad (\text{Eq. 1})$$

Accordingly, each of the gate voltages $V_{Gn}$ supplied to the respective gates of the transistors $Q_n$ of the voltage control devices 30 may be controlled by the controller 20 by controlling the difference between the anodic and cathodic inputs, $V_+$ and $V_-$. If additional gain or adjustment of the regulation is desired, the values of the resistors $R_{n1}$, $R_{n2}$, $R_{n3}$, and $R_{n4}$ may be changed. Finally, reverse biasing of the voltage potential across the electrodes 60 may be achieved by simply adjusting the relative voltage values of $V_+$ and $V_-$. Thus, the cathodic and anodic inputs may effectively switch with one another. Accordingly, the control circuit 40b may be flexibly applied to provide for a constant voltage drop or potential differences to be applied across the electro-optic medium 58.

However, it is worth noting that added resistance may effectively added to each of the above resistors as a result of inherent resistance of the traces 62 of each respective conductive connection. This may impact the output gate voltages $V_{Gn}$ for a given $V_+$ and $V_-$. To minimize this impact, several measures may be taken, conjointly or separately.

First, the resistance of resistor $R_{ny}$ may be one or more order of magnitude higher than resistance of the corresponding conductive connection. Thus, the resistance of the added resistors $R_{ny}$ may be increased. For example, the resistance of the resistor $R_{ny}$ may be increased to one or more order of magnitude greater than the inherent resistance of the conductive connection. Alternatively, the conductive connections may be constructed to have an inherent resistance one or more magnitude lower than the respective resistor $R_{ny}$. Accordingly, $R_{n3}$ may have a resistance one or more order of magnitude greater than the resistance of $1F_n$ and/or $R_{n4}$ may have a resistance one or more order of magnitude greater than the resistance of $1F_n$.

Second, as shown in FIG. 6, an amplifier buffer 80 may be added to $1F_n$ and/or $2F_n$. More specifically, the amplifier buffer 80 may be disposed between the respective resistor $R_{ny}$ and a respective voltage control device 30 and/or $2F_n$ conductive connection origination at the second electrode 60b. An example of an amplifier buffer 80 is illustrated in isolation in FIG. 7.

Figure 8:
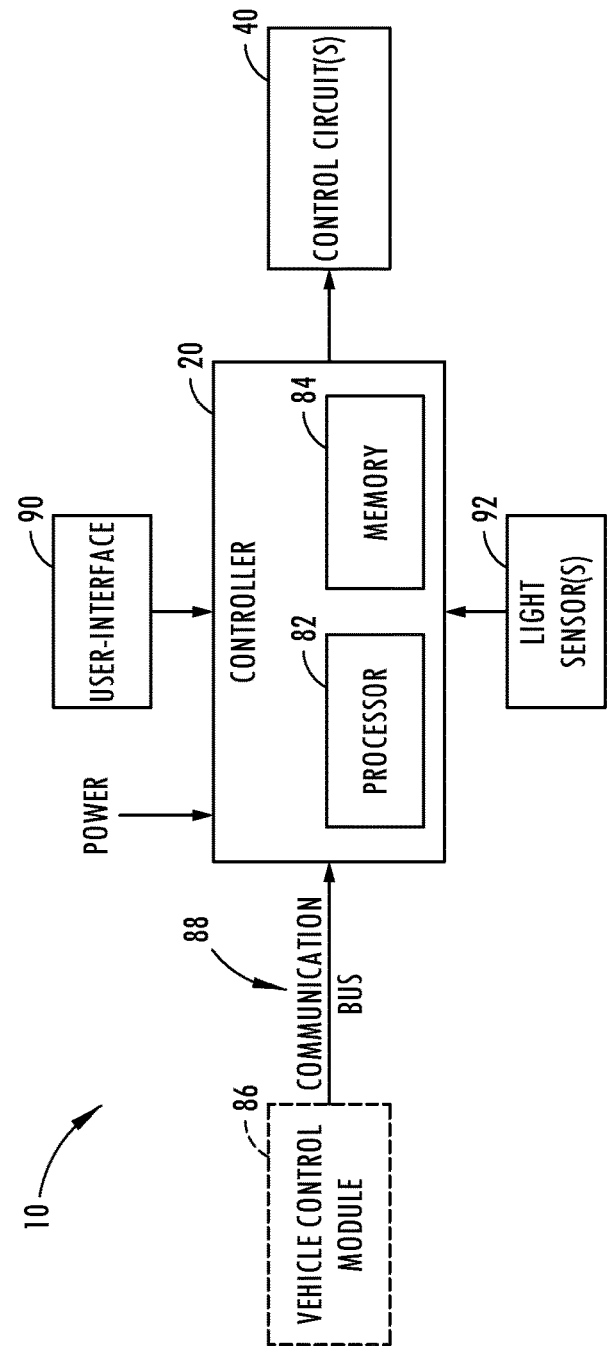
FIG. 8 is a block diagram of a control system configured to control a driving circuit for an electro-optic element in accordance with the disclosure.

Referring to FIG. 8, a block diagram of the control system 10 is shown demonstrating the controller 20. The controller 20 may include a processor 82, which may comprise one or more circuits configured to control the state of the electro-optic element 14. The processor 82 may be in communication with a memory 84, which may be configured to store various instructions and routines configured to control the transmittance of one or more of the electro-optic elements 14 as discussed herein. In various embodiments, the controller 20 may be in communication with a vehicle control module 86 via a communication bus 88. The communication bus 88 may be configured to deliver signals to the controller 20 identifying various states of the vehicle 12. For example, the communication bus 88 may be configured to communicate an operating condition of the vehicle (e.g., an ignition activation, drive gear selection, occupancy detection, headlight operation, etc.) or any other information or control signals that may be communicated by the communication bus 88. The transmittance of the one or more electro-optic elements 14 may be changed based, at least in part, on the operating condition. Accordingly, the control system 10 may provide for a flexible solution to control dimming of the electro-optic elements 14.

The controller 20 may further be in communication with a user interface 90, which may be disposed in the passenger compartment of the vehicle 12 or otherwise associated with the vehicle 12. The user-interface 90 may provide for manual control of the one or more electro-optic elements 14 as discussed herein. In various examples, the controller may further be in communication with one or more sensors 92, which may be monitored in various combinations to identify environmental lighting conditions proximate the vehicle 12 and/or impinging the electro-optic element 14. In this configuration, the controller 20 of the system 10 may automatically control a level of transmittance of light through the electro-optic elements 14. The sensors 92 may include one or more light sensors, which may include interior and/or exterior light sensors. The light sensors may be ambient light sensors, directional light sensors, imagers, photodetectors, or other various light-detecting sensors that can be distributed over an exterior surface of the vehicle 12. Further, the light sensors or imagers discussed herein may be implemented as semiconductor charge-coupled devices (CCD) or pixel sensors of complementary metal-oxide-semi-conductor (CMOS) technologies.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

It will be understood by one having ordinary skill in the art that construction of the described disclosure and other components is not limited to any specific material. Other exemplary embodiments of the disclosure disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent or may be removable or releasable unless otherwise stated.

It is also important to note that the construction and arrangement of the elements of the disclosure, as shown in the exemplary embodiments, are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as "first," "second," and the like, are used solely to distinguish one entity or action from another entity or action, without necessarily requiring or implying any actual such relationship or order between such entities or actions.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The term "transparent" is applied in the relative sense. "Transparent" refers to an optical element or material that is substantially transmissive of at wavelengths in question and thus generally allows light at such wavelengths to pass therethrough. The wavelengths in question will vary based on the context. However, in the event the wavelengths in question is not readily apparent, the wavelengths in question shall generally refer to visible light.

As used herein, the term "and/or," when used in a list of two or more items, means that any one of the listed items can be employed by itself, or any combination of the two or more of the listed items can be employed. For example, if a composition is described as containing components A, B, and/or C, the composition can contain A alone; B alone; C alone; A and B in combination; A and C in combination; A and C in combination; B and C in combination; or A, B, and C in combination.

It is to be understood that although several embodiments are described in the present disclosure, numerous variations, alterations, transformations, and modifications may be understood by one skilled in the art, and the present disclosure is intended to encompass these variations, alterations, transformations, and modifications as within the scope of the appended claims, unless their language expressly states otherwise.

What is claimed is:

1. An electro-optic element, comprising:
   a first substrate comprising a first interior surface;
   a second substrate disposed in a substantially parallel and spaced-apart relationship relative the first substate, the second substrate comprising a second interior surface facing the first interior surface;

a first electrode associated with the first interior surface;
a second electrode associated with the second interior surface;
an electro-optic medium disposed between the first and second electrodes;
a voltage control device electrically connected to the first electrode, the voltage control device operable to receive a supply voltage and to output an activation voltage to the electro-optic medium;
a control circuit configured to receive at least one feedback signal and to control the activation voltage based, at least in part, on the at least one feedback signal;
an electrically conductive trace associated with the first interior surface; and
an insulating layer disposed between the trace and the first electrode, the insulating layer having a pass through connection aligned substantially interior an area defined by the first electrode and through which electrical communication may be made between at least one of:
the voltage control device and the first electrode, and
the voltage control device and the trace.

2. The electro-optic element of claim 1, wherein the voltage control device is a transistor.

3. The electro-optic element of claim 2, wherein the transistor is a flip chip transistor.

4. The electro-optic element of claim 1, wherein the voltage control device is aligned substantially interior an area defined by the first interior surface.

5. The electro-optic element of claim 1, wherein the voltage control device is disposed outside of the first and second substrates and conductively connected to the first electrode through the first substrate.

6. An electro-optic element, comprising:
a first substrate comprising a first interior surface;
a second substrate disposed in a substantially parallel and spaced-apart relationship relative the first substate, the second substrate comprising a second interior surface facing the first interior surface;
a first electrode associated with the first interior surface;
a second electrode associated with the second interior surface;
an electro-optic medium disposed between the first and second electrodes;
a voltage control device electrically connected to the first electrode, the voltage control device operable to receive a supply voltage and to output an activation voltage to the electro-optic medium;
a control circuit configured to receive at least one feedback signal and to control the activation voltage based, at least in part, on the at least one feedback signal;
wherein:
the control circuit comprises an amplifier operable to provide a gate signal to the voltage control device via a first conductive connection with the voltage control device, the gate signal based, at least in part, on a first feedback signal received at a first high impedance input of the amplifier from the voltage control device via a second conductive connection; and
the voltage control device is operable to change the output activation voltage based, at least in part, on the gate signal.

7. The electro-optic element of claim 6, wherein the voltage control device is substantially disposed between the first and second substrates.

8. The electro-optic element of claim 6, further comprising a plurality of the voltage control devices, each disposed in a zone of the electro-optic element and operable to apply substantially equal voltages to the electro-optic medium within the zone.

9. The electro-optic element of claim 6, wherein the amplifier is operable to receive a first voltage input from a controller at a second high impedance input and adjustment of the first voltage input is operable to adjust the gate signal.

10. The electro-optic element of claim 6, wherein the first feedback signal corresponds to the output activation voltage.

11. The electro-optic element of claim 10, further comprising a plurality of voltage control devices and a plurality of respective control circuits.

12. The electro-optic element of claim 10, wherein a second feedback signal is received at a second high impedance input of the amplifier from the second electrode via a third conductive connection, the second feedback signal indicating a received activation voltage by a localized portion of the second electrode, the localized portion being substantially opposite the voltage control device across the electro-optic medium.

13. The electro-optic element of claim 12, further comprising:
a plurality of voltage control devices and a plurality of respective control circuits;
wherein a voltage difference is determined by comparing the first and second feedback signals; and
the control circuit is configured to maintain a substantially constant voltage difference across the electro-optic medium.

14. The electro-optic element of claim 12, wherein:
the first high impedance input is an inverting input;
the second high impedance input is a non-inverting input;
the amplifier is operable to:
receive a first voltage input from a controller at the first high impedance input via a fourth conductive connection, the fourth conductive connection comprising a first resistor having a first resistance;
receive a second voltage input from the controller at the second high impedance input via fifth conductive connection, the fifth conductive connection comprising a second resistor having a second resistance, the first and second resistances being substantially equal;
the second conductive connection comprises a third resistor having a third resistance;
the third conductive connection comprises a fourth resistor having a fourth resistance, the fourth resistance substantially equal the third resistance; and
the gate signal is substantially determined based on the following equation:

$$V_G = R_3/R_1(V_+ - V_-)$$

where $R_1$ is the first resistance, $R_3$ is the third resistance, $V_+$ is the second voltage, and $V_-$ is the first voltage.

15. The electro-optic element of claim 14, further comprising:
a first amplifier buffer disposed between the amplifier and the third resistor; and
a second amplifier buffer disposed between the amplifier and the fourth resistor.

16. An electro-optic element comprising:
a first substrate comprising a first interior surface;
a second substrate disposed in a substantially parallel and spaced-apart relationship relative the first substate, the second substrate comprising a second interior surface facing the first interior surface;

a first electrode associated with the first interior surface;
a second electrode associated with the second interior surface;
an electro-optic medium disposed between the first and second electrodes;
a voltage control device electrically connected to the first electrode, the voltage control device operable to receive a supply voltage and to output an activation voltage to the electro-optic medium;
a control circuit configured to receive at least one feedback signal and to control the activation voltage based, at least in part, on the at least one feedback signal;
a plurality of the voltage control devices, each disposed in a zone of the electro-optic element, wherein an activation of each zone may be adjusted in parallel by controlling the voltage output of each voltage control device.

17. The electro-optic element of claim 16, wherein the zones are spaced apart substantially evenly.

18. The electro-optic element of claim 16, wherein the supply voltage is substantially in excess of the tolerability of the electro-optic medium and the voltage control device is operable to substantially prevent damage of the electro-optic medium.

19. The electro-optic element of claim 1, wherein the transistor is a thin film transistor.

* * * * *